United States Patent [19]

Dreisewerd et al.

[11] Patent Number: 5,079,642
[45] Date of Patent: Jan. 7, 1992

[54] ELECTRO-OPTIC MODULATOR WITH ACOUSTIC DAMPING

[75] Inventors: Doug W. Dreisewerd, Chesterfield; John A. Haack, Foristell; Thomas F. Rigney, Florissant, all of Mo.

[73] Assignee: McDonnell Douglas Corporation, St. Louis, Mo.

[21] Appl. No.: 628,851

[22] Filed: Dec. 13, 1990

[51] Int. Cl.[5] .......................... G02F 1/03; G02F 1/11
[52] U.S. Cl. .................................. 359/245; 359/247; 359/254; 359/285
[58] Field of Search ................ 350/355, 356, 392, 358

[56] References Cited

U.S. PATENT DOCUMENTS 3,663,091  5/1972  Lee ..................................... 350/356

Primary Examiner—Eugene R. Laroche
Assistant Examiner—Evelyn A. Lester
Attorney, Agent, or Firm—Guy R. Gosnell; Benjamin Hudson, Jr.; Timothy H. Courson

[57] ABSTRACT

There is provided by this invention an electro-optic modulator for damping acoustical energy produced by an electro-optic crystal. The modulator couples acoustic energy from the electro-optic crystal to an acoustic coupler due to the matching acoustic impedances of the coupler and the crystal. The coupler transmits the acoustic wave to the acoustic damper which dampens the acoustic energy. The coupler linearly decreases in height in a direction away from the crystal so that the acoustic wave is reflected through more than one damper prior to returning to the crystal, thus further decreasing acoustical energy. Another feature of this invention is the geometrical design of the electro-optic crystal which has two of its faces, which are not attached to a coupler, positioned not to be perpendicular with a face attached to a coupler. This design of the crystal allows for all acoustic waves, even if directed toward a face which does not have an attached coupler, to be reflected toward a face having an attached coupler so that they can be coupled from the cavity and damped. A further feature of this invention is the use of material from the damper in the bonding material between the coupler and the damper so that a gradient interface is formed so that more efficient transmission to and from the damper is obtained.

19 Claims, 1 Drawing Sheet

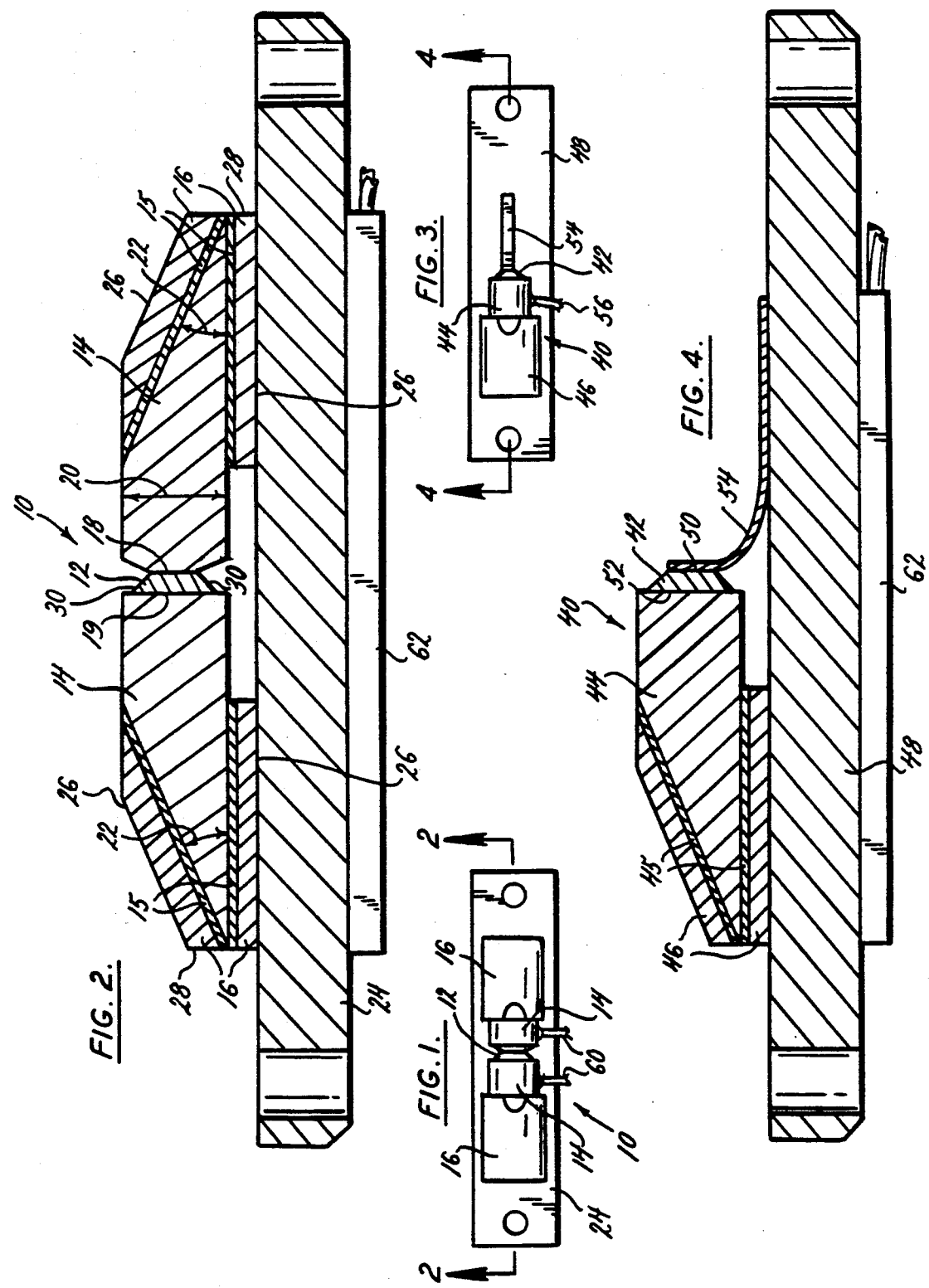

ELECTRO-OPTIC MODULATOR WITH ACOUSTIC DAMPING

BACKGROUND OF THE INVENTION

1. Field of the Invention

The present invention relates generally to electro-optic modulators with acoustic damping and more particularly to electro-optic modulators with acoustic damping which utilize an acoustic coupler to link the modulator crystal to an acoustic damper wherein the acoustic coupler and the acoustic damper are shaped to insure acoustic reflection and scattering within the acoustic damper.

2. Description of the Prior Art

In modern laser apparatus, the laser cavity emission is controlled by regulating the voltage applied to an electro-optic modulator, such as a LiNbO3 crystal. The voltage change across the electro-optic crystal will cause the power within the laser cavity to either be emitted or accumulated depending upon the laser's design due to the polarization change of the light traveling through the crystal. Additionally, the voltage change across the electro-optic crystal generates an undesirable acoustic wave which also alters the polarization of the light traveling through the crystal.

In a typical electro-optic modulator, the acoustic wave, generated by the voltage change, continues to reverberate within the electro-optic crystal even after the voltage applied to the crystal reaches its desired value. This continued reverberation modulates the polarization of the light, thus perturbing the desired laser response. This perturbation may be in the form of light leakage during a period of power buildup prior to emitting a pulse or it may alter the amount of radiation leaving the laser cavity. The acoustic waves also limit the pulse rate at which the laser can emit uniform pulses and distort the temporal profile of the laser pulse.

A typical method of damping acoustic waves in an electro-optic modulator is to immerse the modulator crystal in an appropriate liquid to dampen the acoustic waves. The liquid enveloping the crystal is chosen to match the acoustic impedance of the modulator crystal. This method suffers, however, from several deficiencies including the potential for leakage of the fluid or vaporization or decomposition of the fluid upon the occurrence of a laser pulse with sufficiently high energy. The tendency of liquid to not support shear waves, a property desirable in order to damp acoustic waves, further limits the use of liquid in damping acoustic waves.

An alternative apparatus for damping acoustic waves is the electro-optic device disclosed by Kiefer, et al. in U.S. Pat. No. 3,653,743 which has an acoustic energy absorbing material bonded thereto. However, the device is limited to utilizing dampers which have their planar faces parallel to the electro-optic crystal's face and which have cross-sectional dimensions which are substantially equivalent to those of the crystal in order to maintain best operation. Thus, while this device does couple acoustic waves from the electro-optic crystal and dampen those waves, these limitations cause the device to be inadequate in several respects. The damper's geometry is not designed to prevent reflections from the damper's edge from returning to the crystal following only one pass through the damper and disturbing laser modulation upon their reentry into the electro-optic crystal. Furthermore, when the dampers couple acoustic waves at a resonant frequency, the acoustic energy is stored in the dampers as a standing wave which requires a lengthy time in which to dissipate.

It would be desirable to develop a electro-optic modulator with acoustic damping whose geometry is such that a plurality of reflections will occur within the acoustic damper to scatter the acoustic wavefront before the acoustic energy is reflected towards the crystal. Furthermore, it would be desirable for the electro-optic crystal to be shaped so that acoustic energy traveling within the crystal in a direction where there is no acoustic damper attached is directed towards an interface where there is an acoustic damper attached.

SUMMARY OF THE INVENTION

There is provided by this invention an electro-optic modulator for damping acoustical energy produced by an electro-optic crystal. The modulator efficiently couples acoustic energy from the electro-optic crystal to an acoustic coupler due to the matching acoustic impedances of the coupler and the crystal. The coupler serves to transmit the acoustic wave to the acoustic damper which dampens the acoustic energy. Due to the design of the coupler, constituting another feature of this invention, which linearly decreases in height in a direction away from the crystal, the acoustic wave is reflected through more than one damper prior to returning to the crystal, thus insuring a greater reduction in its acoustical energy than in prior art systems. Another feature of this invention is the geometrical design of the electro-optic crystal which has two of its faces, which are not attached to either coupler, positioned so as to not be perpendicular with a face attached to a coupler. This design of the crystal allows for all acoustic waves, even if directed toward a face which does not have an attached coupler, to be reflected toward a face having an attached coupler so that they can be coupled from the cavity and damped. A further feature of this invention is the use of material from the damper in the bonding material between the coupler and the damper so that a gradient interface is formed so that more efficient transmission to and from the damper is obtained.

BRIEF DESCRIPTION OF THE DRAWINGS

FIG. 1 is a top view of an electro-optic modulator with acoustic damping incorporating the principles of this invention;

FIG. 2 is a sectional view of the electro-optic modulator shown in FIG. 1 taken along line 2—2;

FIG. 3 is a top view of an alternative embodiment of the electro-optic modulator designed to provide acoustic damping with only one pair of dampers; and FIG. 4 is a sectional view of the electro-optic modulator shown in FIG. 3 taken along line 4—4.

DETAILED DESCRIPTION OF THE PREFERRED EMBODIMENT

The preferred embodiment of an electro-optic modulator 10 with acoustic damping, shown in FIGS. 1 and 2, comprises an electro-optic crystal 12, two acoustic couplers 14, and two pairs of acoustic dampers 16. The crystal 12 may be composed of any material exhibiting the electro-optic effect, such as lithium niobate (LiNbO3).

A pair of couplers 14 are bonded to opposite faces of the crystal 12. In order to apply an electric field across the crystal 12 for electro-optic applications, an electrode 60 is attached to each of the two acoustic couplers 14 in a manner which is well known to one skilled in the art. The couplers 14 should be designed so that their acoustic impedance equals the acoustic impedance of the crystal 12. For the previously mentioned exemplary crystal of LiNbO$_3$, a coupler 14 with an equivalent acoustic impedance as that of LiNbO$_3$ is silver. While the bond between the crystal 12 and the coupler 14 may be of composed of various materials as is well known in the art, an exemplary bond for use between a LiNbO$_3$ crystal 12 and a silver coupler 14 is an indium and tin solder which is applied to adjacent crystal 12 and coupler 14 faces which are to be bonded after the adjacent faces have been metallized with a Ti-Pt-Au combination. For most efficient damping, the bond between the crystal 12 and the coupler 14 should be less than one-quarter of the wavelength of the acoustic energy to be damped in thickness. For bond thicknesses which are greater than one-quarter of the wavelength of the acoustic energy to be damped, the acoustic energy will not be coupled as efficiently from the crystal resulting in increased perturbations in the laser modulator's output.

As shown in the sectional view of FIG. 2, the face 18 of the coupler 14 adjacent to the crystal 12 is the same height as the adjoining face of the crystal 12. The height of the coupler 14 is then increased as shown by face 20 until it is equal to the maximum height of the crystal 12 so that the maximum amount of acoustic energy is coupled from the crystal 12. From this maximum height, the coupler 14 linearly decreases in height as the distance from the crystal 12 increases so that the coupler 14 forms a triangular shape. The acute angle 22 is critical to the efficient operation of the electro-optic modulator 10 with acoustic damping as it determines the number of times which the acoustic energy is reflected through the acoustic dampers 16 as hereinafter explained.

A pair of acoustic dampers 16 are attached to each coupler 14 to damp the acoustic energy coupled from the crystal 12. The dampers 16 may be constructed from any material which dampens acoustic waves, such as lead, titanium, or tungsten. In the preferred embodiment, the dampers consist essentially of 97% tungsten by weight and 3% epoxy by weight. The attachment of the acoustic dampers 16 to the couplers 14 in the preferred embodiment is accomplished by means of a mixture of 50% tungsten by weight and 50% epoxy by weight which is applied in a thin layer 15 between the coupler 14 and the damper 16. The use of the damper material, tungsten, within the bonding mixture allows for the formation of a gradient interface between the damper 16 and the coupler 14 so that acoustic energy is more efficiently transferred to or from the damper 16.

As shown in FIGS. 1 and 2, the electro-optic modulator 10 with acoustic damping may be attached on a mounting surface 24 which in turn may be connected to a source of heat 62. By applying heat from the heat source 62 to the electro-optic modulator 10 by means of the thermally conductive mounting surface 24, the components of the electro-optic modulator each expand based upon their individual coefficients of expansion such that increased contact is maintained between the components to permit improved acoustic energy coupling and damping. For a modulator composed of the exemplary materials previously discussed, heat is typically applied such that the modulator is held at 40° C. for best operation. The mounting surface 24 may be constructed from Beryllium Oxide (BeO) or any other suitable material as is well known in the art.

The operation of the electro-optic modulator 10 with acoustic damping is initiated by the application of a voltage differential to the electrodes 60 which is then transmitted from the electrodes 60 to the coupler 14 and then to the electro-optic crystal 12. Once energized, the crystal 12 produces acoustic waves which are transmitted from the electro-optic crystal 12 to the coupler 14. As previously discussed, the acoustic impedance of the coupler 14 is nearly matched to the acoustic impedance of the crystal 12 so that the acoustic energy will exit the crystal 12 without being reflected internally by the crystal faces due to a mismatch in acoustic impedances in the different materials. Thereafter, the acoustic energy is drawn away from the crystal 12, where it could cause destructive interference, by being conducted through the coupler 14 to the dampers 16.

The design of the couplers 14 is such that all acoustic waves which exit the crystal 12, either perpendicular to the face of the crystal or in a typical diverging fan configuration, are transmitted to at least one damper 16. This effect is due to the linear decrease in the couplers' height in the direction away from the crystal 12. The rate of the linear decrease is dependent on the angle 22. As the acoustic wave is transmitted away from the crystal 12 it will eventually contact a damper 16. The acoustic wave, after having been refracted upon entry to the damper 16 due to the different acoustic impedances in the damper 16 and coupler 14 materials, is conducted through the damper 16 until it reaches the damper/external environment interface 26 where the acoustic wave is reflected for another pass through the damper 16. During the transmission of the acoustic wave through the damper 16, the amplitude of the acoustic wave is decreased due to a transfer of energy from the acoustic wave to the damper 16 in the form of heat due to the increased vibrations within the matrix of material forming the damper 16 caused by the acoustic wave.

The damped acoustic wave is refracted once more as it exits the damper 16 and reenters the coupler 14 through which it is again transmitted. Due to the coupler's linear decrease in height, the majority of acoustic waves will be transmitted from one damper 16 to the other damper 16 of the pair. This process will be repeated as the acoustic wave is reflected between the dampers 16 as the acoustic wave travels away from the crystal 12. Upon the acoustic wave's reflection at the damper/external environment interface 28 at the far end of the electro-optic modulator 10, the acoustic wave will proceed to return toward the crystal 12 while again being reflected between the pair of dampers 16. Due to the repeated reflections through the dampers 16, each of which decreases the acoustic energy of the wave, the amount of acoustic energy which may return to the crystal 12 is extremely small and thus will not deleteriously effect the crystal's performance.

The angle 22 between the dampers 16 determines the number of times which the acoustic wave will be reflected through the dampers 16. As the angle 22 is decreased, the acoustic wave will be reflected through more dampers 16 and will thus lose a greater percentage of its energy. Likewise, as the angle 22 is increased, the acoustic wave will be reflected through fewer dampers 16 and will thus retain a greater percentage of its energy. However, as the angle 22 is decreased to increase damping, the length of the electro-optic modulator 10 will be increased for a crystal 12 of the same height. Thus, the modulator designer is faced with a tradeoff between the size of the modulator 10 and the amount of damping desired, which was resolved in the preferred embodiment with an angle 22 of approximately 21°.

An additional feature of the electro-optic modulator 10 with acoustic damping is the geometrical design of the crystal 12. The crystal 12 has six faces; two of which 18 and 19 are bonded to the couplers and four of which 30 are not attached to another surface. As shown in FIG. 1, two of the unattached faces 30 are designed to not be perpendicular to the faces 18 and 19 bonded to the coupler so that the acoustic energy which reflects from the two nonperpendicular crystal/external environment faces 30 is next transmitted toward a coupler/crystal interface 18 or 19 where it may be coupled from the crystal 12 to be subsequently damped. The remaining two unattached faces 30 are perpendicular to the faces 18 and 19 attached to the couplers and parallel to each other in order to allow the crystal to function properly. In prior art electro-optic crystals, the faces of the crystal were all mutually perpendicular so that acoustic energy would be continuously reflected between a pair of opposite faces and either would not be reflected toward an adjoining face where it could be coupled from the crystal and damped as was previously discussed, or, alternatively, the prior art electro-optic device would require a coupler and damper to be attached to each crystal face to effectively dampen the acoustic energy resulting in a bulkier and more expensive electro-optic device.

An alternative embodiment of the electro-optic modulator 40 with acoustic damping is shown in FIGS. 3 and 4 in which the modulator 40 comprises a electro-optic crystal 42, one acoustic coupler 44, and one pair of acoustic dampers 46. Additionally, as previously discussed, the electro-optic modulator 40 may be attached to a mounting surface 48 which may in turn be thermally connected to a heat source 64 so as to heat the electro-optic modulator 40 and increase its acoustic damping efficiency.

The modulator 40 shown in FIGS. 3 and 4 utilizes only one coupler 44 which is bonded, by a thin gradient interface layer 45, to one set of dampers 46 since the crystal face 50 located opposite to the crystal face 52 adjoining the sole coupler 44, which in the previously discussed embodiment was bonded to a coupler, is attached to an electrode 54 which serves to reflect the acoustic energy arriving at its electrode/crystal interface 50 toward the crystal face 52 adjacent to the coupler 44 to permit subsequent coupling from the crystal 42 and damping of the acoustic energy as previously discussed. An additional electrode 56 is attached to the coupler 44 so that a voltage differential between electrodes 54 and 56 can be applied to the electro-optic crystal 42 as previously discussed.

The coupler 44, dampers 46, and electro-optic crystal 42 of the alternative embodiment of the electro-optic modulator 40 with acoustic damping are designed and operate in an identical fashion to those previously described. Thus, by the elimination of one coupler and one pair of dampers from the modulator design discussed previously, the alternative embodiment performs the same function of damping acoustic energy but is smaller and requires less complicated fabrication.

Although there has been illustrated and described specific detail and structure of operations, it is clearly understood that changes and modifications may be readily made therein by those skilled in the art without departing from the spirit and the scope of this invention.

We claim:

1. An electro-optic modulator with acoustic damping, comprising:
   a) a crystal which exhibits an electro-optic effect;
   b) a plurality of acoustic energy coupling means bonded to the crystal wherein the acoustic impedance of the coupling means is substantially equivalent to the acoustic impedance of the crystal;
   c) a plurality of acoustic energy dampers attached to the plurality of coupling means by a first bonding material, at least two dampers being attached to each of the coupling means; and
   d) a means for applying an electric field between a pair of oppositely disposed faces of the crystal.

2. The electro-optic modulator with acoustic damping as recited in claim 1 wherein the plurality of coupling means and the crystal bonded thereto are attached by a second bonding material.

3. The electro-optic modulator with acoustic damping as recited in claim 2 wherein the second bonding material separates the crystal and the plurality of coupling means by less than one-quarter of a wavelength of the acoustic energy to be damped.

4. The electro-optic modulator with acoustic damping as recited in claim 3 wherein the first bonding material consists essentially of an epoxy material and a material from which the plurality of dampers are composed.

5. The electro-optic modulator with acoustic damping as recited in claim 4 wherein the plurality of coupling means comprises a plurality of substantially triangular acoustic energy couplers bonded to the crystal such that the sides of the couplers bonded to the crystal are of substantially the same height as the crystal.

6. The electro-optic modulator with acoustic damping as recited in claim 5 wherein the plurality of couplers further comprises two substantially triangular acoustic energy couplers attached to oppositely disposed faces of the crystal.

7. The electro-optic modulator with acoustic damping as recited in claim 6 wherein the crystal is composed of lithium niobate.

8. The electro-optic modulator with acoustic damping as recited in claim 7 wherein the plurality of acoustic energy dampers are substantially composed of a material selected from the group consisting of lead, titanium, and tungsten.

9. The electro-optic modulator with acoustic damping as recited in claim 8 wherein the two couplers are composed of silver.

10. The electro-optic modulator with acoustic damping as recited in claim 9 wherein the means for applying an electric field comprises a first electrode attached to a first coupler and a second electrode attached to a second coupler.

11. An electro-optic modulator with acoustic damping, comprising:
    a) a crystal which exhibits an electro-optic effect;
    b) an acoustic energy coupling means bonded to the crystal wherein the acoustic impedance of the coupler is substantially equivalent to the acoustic impedance of the crystal;
    c) a plurality of acoustic energy dampers attached to the coupling means by a first bonding material, at least two dampers being attached to each of the coupling means; and d) a means for applying an electric field between a pair of oppositely faces of the crystal.

12. The electro-optic modulator with acoustic damping as recited in claim 11 wherein the coupling means and the crystal bonded thereto are attached by a second bonding material.

13. The electro-optic modulator with acoustic damping as recited in claim 12 wherein the second bonding material separates the crystal and the coupling means by less than one-quarter of a wavelength of the acoustic energy to be damped.

14. The electro-optic modulator with acoustic damping as recited in claim 13 wherein the first bonding material consists essentially of an epoxy material and a material from which the plurality of dampers are composed.

15. The electro-optic modulator with acoustic damping as recited in claim 14 wherein the coupling means comprises a substantially triangular acoustic energy coupler bonded to the crystal such that the side of the coupler bonded to the crystal is of substantially the same height as the crystal.

16. The electro-optic modulator with acoustic damping as recited in claim 15 wherein the crystal is composed of lithium niobate.

17. The electro-optic modulator with acoustic damping as recited in claim 16 wherein the plurality of dampers are substantially composed of a material selected from the group consisting of lead, titanium, and tungsten.

18. The electro-optic modulator with acoustic damping as recited in claim 17 wherein the coupler is composed of silver.

19. The electro-optic modulator with acoustic damping as recited in claim 18 wherein the means for applying an electric field comprises a first electrode attached to the coupler and a second electrode attached to a face of the crystal oppositely disposed from the face of the crystal bonded to the coupler.

* * * * *